(No Model.)
J. BARRY.
CAR COUPLING.
No. 322,672. Patented July 21, 1885.
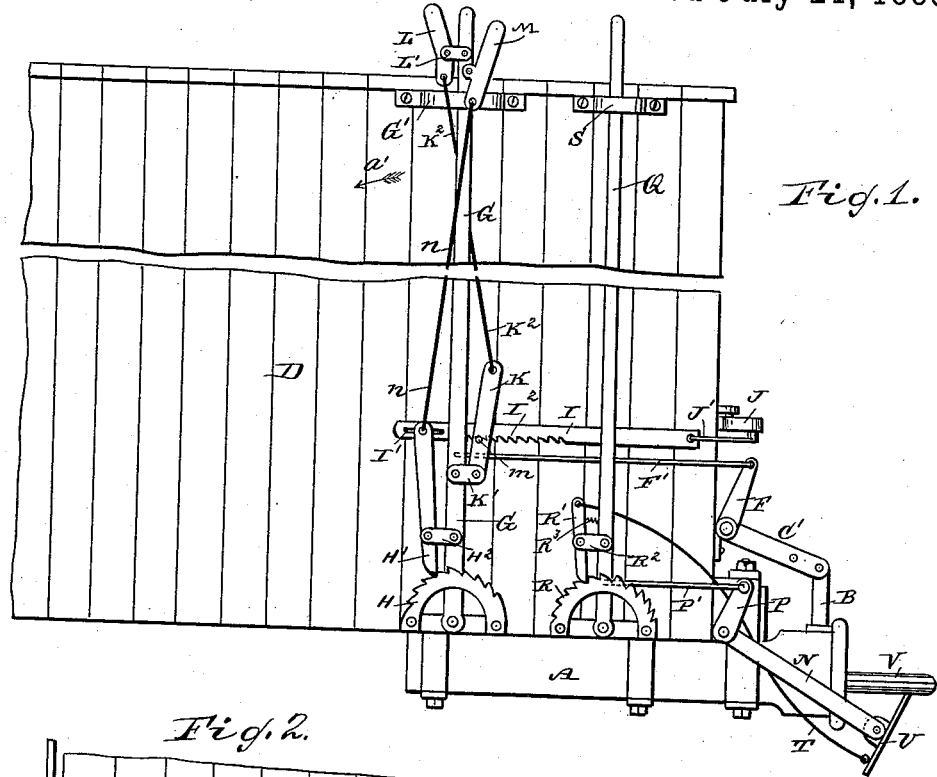
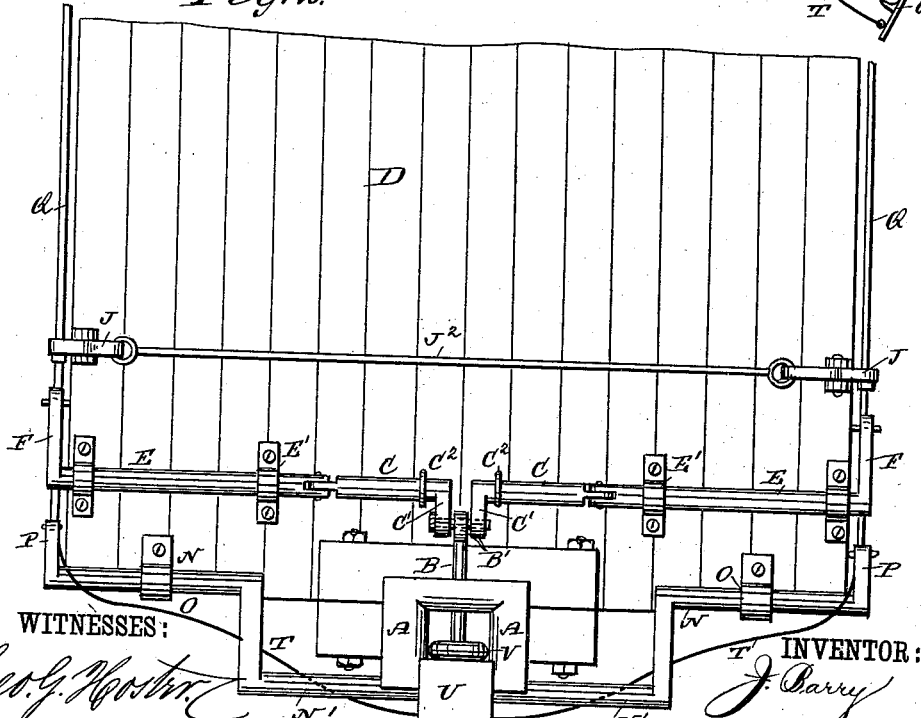
WITNESSES:
Theo. G. Hoster
C. Sedgwick
INVENTOR:
J. Barry
BY Munn & Co.
ATTORNEYS.

UNITED STATES PATENT OFFICE.

JAMES BARRY, OF WILLMAR, MINNESOTA.

CAR-COUPLING.

SPECIFICATION forming part of Letters Patent No. 322,672, dated July 21, 1885.

Application filed May 27, 1885. (No model.)

*To all whom it may concern:*

Be it known that I, JAMES BARRY, a resident of Willmar, in the county of Kandiyohi and State of Minnesota, have invented a new and Improved Car-Coupling, of which the following is a full, clear, and exact description.

Reference is to be had to the accompanying drawings, forming a part of this specification, in which similar letters of reference indicate corresponding parts in both the figures.

Figure 1 is a side view of a car provided with my improved car-coupling, parts being broken out. Fig. 2 is an end view of the same.

The draw-head A is of the usual construction and receives a coupling-pin, B, which is mounted on a pin, B', in cranks C' on the adjacent ends of two horizontal shafts, C, held by the clips C² on the end of the car D. The outer ends of the shafts C are hinged to the inner ends of rods E, held by clips E' on the end of the car, and each rod E is provided at its outer end with a crank-arm, F, each arm F being connected by a rod, F', with a lever, G, pivoted to the side of the car at the bottom, extending upward and passing through a suitable guide, G'.

Outside of the pivoted end of each lever G a semicircular rack, H, is secured on the side of the car, and with the same a dog, H', engages which is connected by a link, H², a short distance above its lower end with the lever G. On the upper end of each dog H' a pin is formed, which is passed through a longitudinal slot, I', in the rear end of a bar, I, on the side of the car, in the bottom edge of which bar I a rack, I², is formed. The front end of each bar I is connected by a rod, J', with one end of an angle-lever, J, pivoted to swing in the horizontal plane at the corner of the car, the other ends of said levers J at the opposite side edges of the end of the car being united by a rod, J². A lever, K, has its lower end connected by a link, K', with the lever G below the rack I, and the upper end of the said lever is connected by a rod, K², with a lever, L, connected by a link, L', with the lever G. The lever K is provided with a pin, m, adapted to engage with the rack I² on the bar I.

A shaft, N, having a crank part, N', at its middle, is held by clips O on the bottom of the end of the car to turn on its longitudinal axis, and is provided at each end with a crank-arm, P, connected by a rod, P', with a lever, Q, pivoted at its lower end to the side of the car at the bottom edge of the same. At the lower pivoted end of each lever Q a semicircular rack, R, is secured on the side of the car, and with the same a dog, R', engages, which is connected by a link, R², with the lever Q. A spring, R³, interposed between the upper end of the dog R' and the lever Q presses the upper end of the dog from the lever Q. The lever Q passes through a suitable guide, S, on the side of the car. A curved spring-rod, T, is secured to the upper end of each dog R', passes down over the shaft N under the crank part N', and is secured to the back of a plate, U, mounted to turn on the crank part N' of the shaft N, the said spring being connected with the plate U below its pivots. The spring T, acting on the plate U, holds the same erect, and the said plate holds the link V horizontal.

To uncouple—that is, to raise and withdraw the link V—the lever G is swung in the direction of the arrow a', Fig. 1, and is locked in place by the dog H'. As the two levers G on the two sides of the car are connected by the rods F' with the pin B', to which the pin B is fastened, the lever on the other side of the car will also be moved.

To lower the pin B for coupling, the dog H' must be disengaged from the teeth of the semicircular rack H. This is accomplished by pressing the lever M toward the lever G, whereby the upper end of the dog H' is drawn by the rod n in the inverse direction of the arrow a'; but at the same time the dog H' on the other side of the car must be disengaged from the rack. This is accomplished by pressing the upper end of the lever L in the inverse direction of the arrow a', whereby the lower end is moved in the direction of the arrow a', as is also the upper end of the lever K; and by means of the pin m the bar I is moved in the direction of the arrow a', and by means of the rods J', the angle-levers J, and the connecting-rod J² the bar I on the other side of the car is moved toward the end of the car, and when its slotted end I' strikes the pin on the upper end of the corresponding dog, H', said dog is also raised, thus permitting of swinging the lever G in the inverse direction of the arrow $a'$, and the pin B is lowered and passed through the link that is passed into the draw-head.

The link-raising device can also be operated from either side of the car. To raise the link—that is, to swing the plate U and the crank part N' on which it is held upward—either lever Q must be swung in the direction of the arrow $a'$; and when the said lever Q is swung in the inverse direction of the arrow $a'$ the crank part N' is swung downward. When a lever, Q, is swung in the direction of the arrow $a'$, it is automatically locked by the dog R'. To disengage the dog R', so as to permit of swinging the lever Q in the inverse direction of the arrow $a'$ to permit the crank part to swing down, the upper end of the dog R' must be swung toward the lever Q, whereby that end of the spring T connected with said dog is moved toward the end of the car, and the other end of the spring is moved in a like manner, and also moves the upper end of the other dog in the inverse direction of the arrow $a'$, whereby both dogs are disengaged from the racks and permit both levers Q to be swung in the inverse direction $a'$ to accomplish the desired result.

Having thus described my invention, I claim as new and desire to secure by Letters Patent—

1. The combination, with a draw-head, of shafts journaled on the end of the car and provided with projecting parts to which the coupling-pin is pivoted, cranks on the ends of the shafts, a lever on each side of the car, and a rod connecting the crank of each shaft with the lever at the same side of the car at which the crank is located, substantially as herein shown and described.

2. The combination, with a draw-head, of shafts journaled on the end of the car, the levers G, pivoted to the sides of the car, the rods F', connecting said levers with cranks formed on the ends of the shafts, a coupling-pin held to a crank formed at the inner ends of the shafts, a semicircular rack at each lever G, and a dog engaging with said rack, substantially as herein shown and described.

3. The combination, with a draw-head, of shafts journaled on the end of the car, a pin held in the crank parts of said shafts, the levers G on the sides of the car, the rods F', connecting the said levers with the cranks on the ends of the shafts on the ends of the car, semicircular rack H at each lever G, the dog H', engaging with the rack, the link H², connecting the dog with the lever G, the lever M, pivoted to the lever G, and the rod $n$, connecting the dog H' and the lever M, substantially as herein shown and described.

4. The combination, with a draw-head, of shafts journaled on the end of the car, a pin held in the crank parts of said shafts, the levers G on the sides of the car, the rod F', connecting said levers with the cranks on the shafts on the end of the car, a semicircular rack, H, at each lever G, the dog H', engaging with the rack, the link H², connecting the dog with the lever G, the lever M, pivoted to the lever G, and the rod $n$, connecting the dog H' and the lever M, the lever K, having a pin, $m$, the link K', connecting the lever K with the lever G, the lever L, the rod K², connecting the levers L and K, the bar I, having a rack, I², formed on its bottom edge, angle-pieces J on the corners of the car, the rod J², connecting the angle-pieces J' at the end of the car, and rods connecting the angle-pieces with the bars I, substantially as herein shown and described.

5. The combination, with a draw-head, of the shaft N, having a crank part, N', and arms P at the ends, the levers Q, the rods P', connecting the arms P with the levers Q, and the plate U, pivoted on the crank part N', substantially as herein shown and described.

6. The combination, with a draw-head, of the shaft N, having a crank part, N', the plate U, pivoted on the crank part, the levers Q, the rods P', connecting the levers Q with the arms P, of the shaft N, the semicircular racks R, the dogs R', connected with the levers Q, the springs R³, acting on the dogs, and the spring T, secured to a dog, R', at each side of the car, passed over the shaft N, and secured to the lower part of the plate U, substantially as herein shown and described.

JAMES BARRY.

Witnesses:
WM. DEMPSEY,
SAMUEL PATTON.